April 21, 1925

Re. 16,051

J. S. BROWN

REAMER

Original Filed Nov. 4, 1919 3 Sheets-Sheet 1

Inventor
J. S. Brown
by Hazard & Miller
Attys

April 21, 1925.
Re. 16,051
J. S. BROWN
REAMER
Original Filed Nov. 4, 1919 3 Sheets-Sheet 2
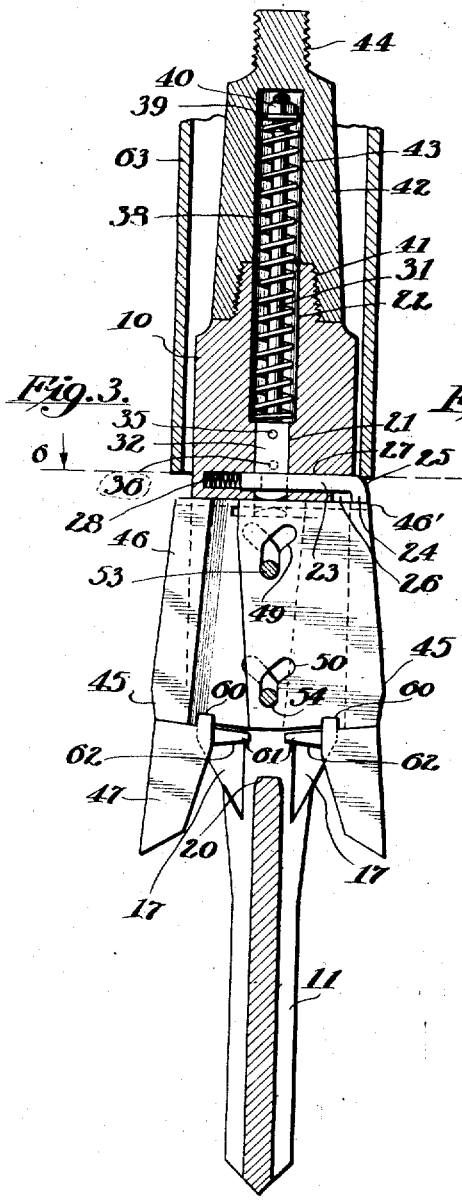
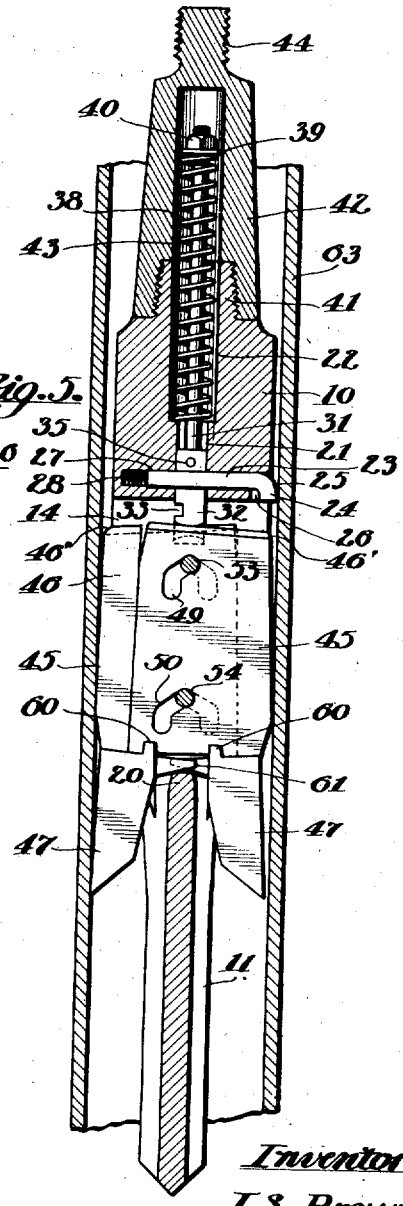
Inventor
J. S. Brown
Hagar & Miller
by
Attys April 21, 1925.
Re. 16,051
J. S. BROWN
REAMER
Original Filed Nov. 4. 1919 3 Sheets-Sheet 3
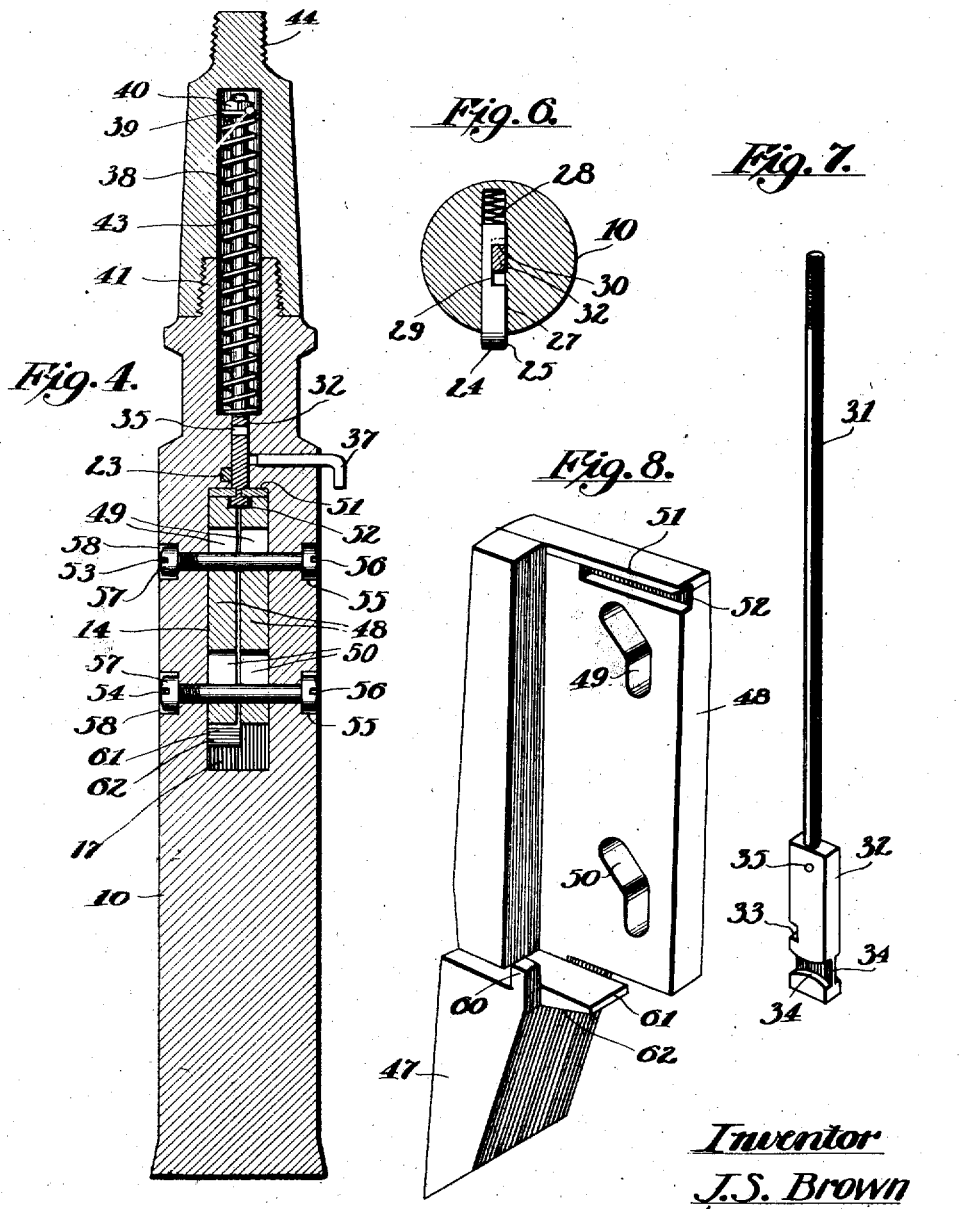
Inventor
J.S. Brown
by Hazard & Miller
Attys Reissued Apr. 21, 1925. Re. 16,051

UNITED STATES PATENT OFFICE.

JACOB S. BROWN, OF LOS ANGELES, CALIFORNIA, ASSIGNOR OF ONE-HALF TO WALTER F. EICHENHOFER, OF LOS ANGELES, CALIFORNIA.

REAMER.

Original No. 1,390,876, dated September 13, 1921, Serial No. 335,739, filed November 4, 1919. Application for reissue filed August 11, 1923. Serial No. 656,905.

*To all whom it may concern:*

Be it known that I, JACOB S. BROWN, a citizen of the United States, residing at Los Angeles, in the county of Los Angeles and State of California, have invented new and useful Improvements in Reamers, of which the following is a specification.

This invention has reference to well drilling apparatus.

The object of the invention is to produce a combined bit and reamer having means whereby the reamer jaws will be pocketed in the stock of the bit, as the bit passes through the casing, and whereby the reamer jaws will be expanded, and locked in operative position after passing through the end of the casing.

A further object of the invention is to produce a drill for oil wells or the like having reamer jaws associated therewith and normally pocketed therein, means being provided for locking the jaws in their pockets, means being also provided for expanding or swinging the jaws angularly with respect to the bit stock when the same are brought to operative position, and means being also provided for permitting the jaws to be again received in their pockets when the bit is to be removed from the well casing.

It is a still further object of the invention to provide a bit for well drilling devices having reamers associated therewith and connected thereto in such a manner as to be effectively housed or pocketed in non-operative position and firmly sustained in operative position, means actuated by contact with the well casing being provided for automatically housing the reamers when the bit is withdrawn from the casing.

Other objects and advantages will present themselves as the nature of the invention is better understood, reference being had to the accompanying drawings, in which:

Fig. 3 is an approximately central longitudinal sectional view therethrough.

Fig. 4 is a similar view but taken at right angles to Fig. 3.

Fig. 5 is a sectional view illustrating the manner in which the reamer jaws are brought to non-operating position when the bit is to be withdrawn from the well casing.

Fig. 6 is a tranverse sectional view approximately on the line 6—6 of Fig. 3.

Fig. 7 is a perspective view of the spring influenced jaw mandrel.

Fig. 8 is a perspective view of one of the reamer jaws.

Figure 1:
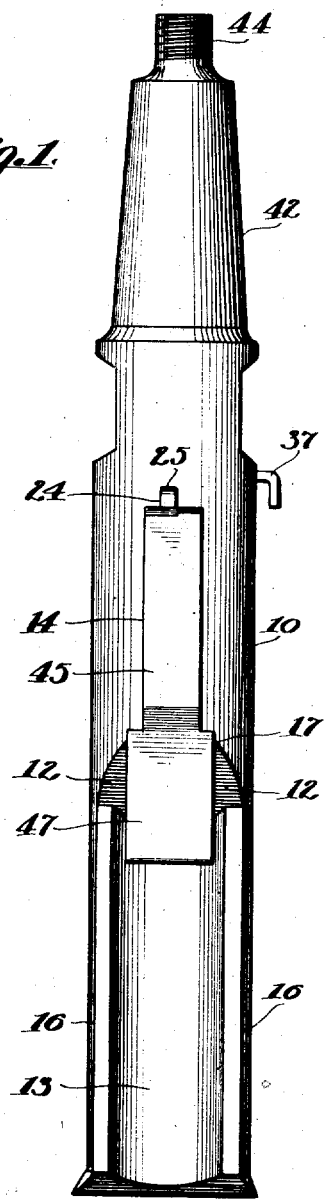
Figure 1 is an elevation of the improvement.
Figure 2:
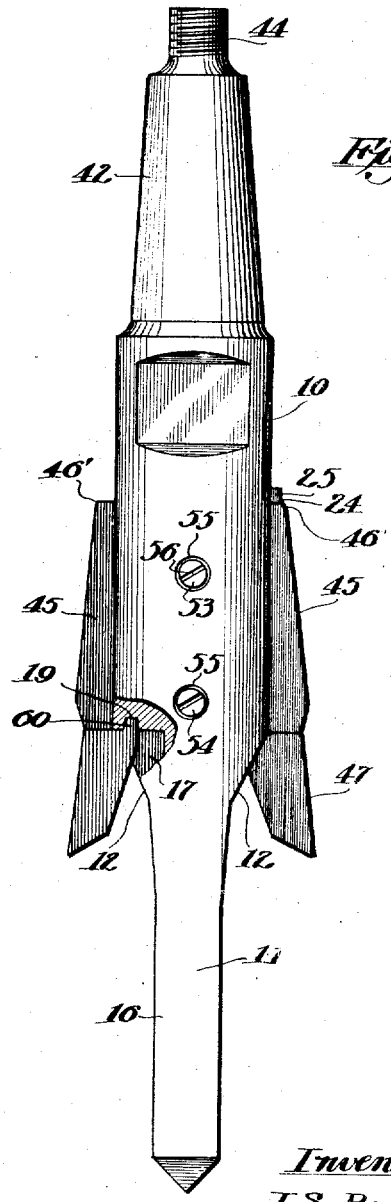
Figure 2 is a similar view, parts being broken away, and taken at a right angle to the showing in Fig. 1.

The bit stock is indicated by the numeral 10, and comprises a member which is round in cross section. The stock, at the lower end thereof is integrally formed with the bit 11. The bit is provided by preferably widening the end of the stock, beveling the same inwardly toward the center thereof as at 12 and reducing the sides of the stock for the length of the bit, and further centrally depressing or channeling the reduced sides as indicated by the characters 13. The stock, above the bit 11 is provided, for a determined length, with an opening 14, that passes through the stock from the sides thereof on which the sides of the bit are formed. The stock 10 is rounded to the flat edges 16 on the wide sides of the bit, and the walls of the opening, at the said rounded portion of the stock are cut to provide pockets 17, and the upper walls of these pockets are notched as at 19. The sides of the bit, at the end thereof adjacent the opening 14 are beveled inwardly toward the said opening as indicated by the numerals 20.

The upper wall of the opening has a rectangular passage 21 in the center thereof which communicates with a round bore 22 that extends from the outer or upper end of the stock.

Arranged in a transverse socket 27 in the stock, at the rectangular passage 21 therein is a key 23. The key has its outer end formed with a head 24, and the upper corner of the said head is rounded as at 25. This head is designed to be received in a notch 26 on one side of the stock and which notch, of course, communicates with the socket 27. The key is influenced by a spring 28 that is received in the inner portion of the socket 27 so that the head of the key is normally forced outwardly of the stock. The key is provided with a notch 29 on one of the sides thereof, the said notch being of a length approximately equaling or slightly greater than the width of the passage 21 and the spring 28 influences the key so that the inner shoulder 30 provided by the notch in the said key is received in and partly closes the rectangular passage 21.

The mandrel for the reamers comprises rod member 31 having its outer end threaded and its inner end provided with a substantially rectangular head portion 32. This head is of a size to be snugly received in the rectangular passage 21, the rod being received in and projecting outward of the bore 22. The head 32 has one of its edges notched as at 33 and below the notch is provided on both of its sides with transverse grooves 34. Above the notch the head is provided with a round opening 35. The head 32 of the mandrel passes through the notch 29 in the key 23, and when the notch on the said head of the mandrel is brought opposite the socket 27 the spring influenced key will bring the shoulder 30 into the notch 33, thus locking the mandrel in one position with respect to the stock and with respect to the opening 14 in the stock. The stock is provided with an opening 36 designed, when the mandrel is brought to a second position to register with the opening 35 in the head thereof, and adapted to pass through these registering openings is a pin 37 which locks the mandrel in one position and which holds the reamers against opening or being brought to operative position. The pin is only applied when the stock is conveyed from place to place or is not desired for immediate use.

Surrounding the stem 31 of the mandrel is a helical spring 38. The lower end of this spring finds a bearing on the shoulder provided by the inner wall of the bore 22, and its outer end in contacted by a washer 39 which is adjustably engaged by a nut 40 which is screwed on the outer and threaded end of the stem 31.

The outer end of the stock is provided with a conical boss 41 through which the round opening in the said stock passes. This boss is provided with exterior threads which are designed to co-engage with interior threads in a frusto-conical opening in the lower end of the cap 42 for the stock 10. The cap 42, above its conical opening is provided with a bore 43 receiving therein the end of the rod 31, and the said cap has upon its upper and outer end the usual cone-shaped threaded extension 44 to receive the socket end of operating rod.

The reamer comprises two similarly constructed reamers 45 each having a substantially rectangular shank 46 and a widened toothed portion 47 extending from the shank. The shank of each of the jaws is provided with a reduced extension in the nature of a right angular flange 48, and each of these flanges is provided with a pair of spaced angle slots 49 and 50 respectively. The flanges of the respective jaws are designed for lapping engagement when the respective reamers are arranged in the opening 14 of the stock. When so arranged the angle openings of the respective flanges aline. Ledges 51 are formed at the outer ends of slots 52 in each of the flanges at the upper edges thereof. These ledges are received in the grooves 34 on the head 32. Bolt members 53 and 54 respectively are passed through alining openings in the sides of the stock 10 and through the angle openings in the flanges. The heads of the bolts are kerfed and are received in depressions 55 in the sides of the stock. Nuts 57 engage the bolts 53 and 54 and are received in depressions or pockets 58 on the opposite sides of the stock 10 and these nuts may be castellated or have their opposite edges provided with kerfs 59.

The toothed portion 47 of each reamer 45 has its inner face extended beyond its shank and the inner corners of said extensions provided with lugs 60 that are designed to be received in the notches 19 when the reamers are in operative position. The inner face of each of the said toothed portions, inward of one of the lugs, and outward of the flange of the shank is formed with a tongue 61, the under face of the said tongue being beveled as at 62. These tongues are designed to ride over the beveled surfaces 20 at the upper edge of the bit 11 and to rest upon the said upper edge when the reamers are in inoperative position. Also each of the tongues underlies and rests on the bottom of the flange of the adjacent or co-operating reamer as well as contacts with one of the walls of the opening 14, when the reamers are in operative position, whereby to more effectively support and sustain the said reamers in such operative position. In addition to this, the shoulders provided between the shanks and the toothed portions of the reamers rest against the upper walls of the pockets 17 when the reamers are in operative position, while the shanks and flanges contact with the straight side walls of the opening 14 to additionally support the reamers firmly in operative position.

When the device is inserted in a well casing 63, the key 25 is moved inwardly through the passage 21 against the pressure of its spring 28 to bring the shoulder 30 out of the notch 33 in the head 32 of the mandrel. A pressure is exerted in the outer end of the stem 31 to move the mandrel inwardly through the stock to cause the mandrel through the engagement of the walls provided by the grooves 34 therein with the ledges 51 on the flanges of the reamers to force the reamers inwardly of the stock incident to the arrangement of the bolts 53 and 54 in the angle slots 45 and 50 on the flanges of the said reamers. The bit is forced downward through the casing, and after the upper ends of the shanks of the said reamers pass the lower edge of the casing, the spring 28 will force the key 23 outwardly through the passage 27, the spring 38 in the meantime having moved the mandrel upwardly of the stock, so that the shoulder 30 provided in the slot 29 of the key will be received in the notch 33 of the mandrel 32. This upward movement of the mandrel influences the reamers to their outward and operative position, the bolts 53 and 54 being now arranged in contacting engagement with the lower walls provided by the vertical passages in the angle slots 49 and 50. When an upward pull is exerted upon the stock the rounded corner 25 of the key will be contacted by the lower edge of the casing, again forcing the same inwardly of its passage and the shoulder thereof out of the notch 33 in the head 32 of the mandrel. A further upward pull of the stock through the casing will bring the upper and rounded corners 46′ against the lower end of the casing, moving the said reamers downwardly and causing the same to be moved inwardly to their initial position against the tension of the spring 38 of the mandrel after the interengaging elements between the reamers and the stock have been brought out of such engagement.

From the foregoing description taken in conjunction with the accompanying drawings, it will be manifest that I have provided a reamer for wells in which the stock and blades or cutters are constructed so that the cutters are effectively supported in operative position to withstand the percussions, stresses, and circumferential strains to which they are subjected during operation of the reamer. Further, the stock and cutter construction reduces to a minimum the possibility of the cutters being broken and lost in a well.

After having described and ascertained the nature of my invention, what I claim as new is:

1. A drill designed to be passed through a well casing including a stock, having an integrally formed bit at the lower end thereof and having a transverse opening above the bit, reamers having upper rounded corners and having lapping flanges which are received in said opening, means between the flanges and the stock for permitting a limited longitudinal and lateral movement of the reamers through the opening, spring means for influencing the reamers to an outward and angular position with respect to the stock, interengaging means between the respective reamers when in such position, elements on the reamers contacting with the stock when the reamers are in such position, spring influenced laterally movable latching means for engaging said spring influenced means for locking the latter when the reamers are in such operative position, and said latching means and the rounded corners of the reamers being arranged for contact with the lower end of the casing when the stock is moved upwardly toward the casing whereby to release the latching means and to exert a downward pressure upon the rounded corners of the reamers to move the latter against the influence of the spring means to bring the interengaging means therebetween out of such engagement and the contacting elements out of contact with the stock and to again seat the reamers in the opening in the stock.

2. A drill designed to be passed through a well casing, including a stock having an integral bit at the lower end thereof and having a transverse slot above the bit, oppositely arranged reamers having flanges received in the opening, said flanges having oppositely arranged alining angle slots therethrough, bolt members passing through the stock and received in said slots, said flanges having ledges at their upper edges, a mandrel having a slotted portion receiving the ledges, said mandrel also having a notched edge, and a projecting stem, spring means between the stem and stock for influencing the mandrel in an upward direction through the stock, a laterally movable spring influenced latch having an outer rounded head designed to engage in the notch of the mandrel when the latter is influenced by its spring to move the reamers upwardly through the opening in the stock and to cause the angle walls of the slot therein to be influenced by the bolts and project said reamers at an outward angle with respect to the stock, tongues on the respective reamers engaging the stock when the reamers are in such position and said latch and reamers designed for engagement with the wall of the bore of the casing when the drill is passed through the casing for bringing the latch to unlatching position and for influencing the reamers to an inward and inoperative position in the opening in the stock.

3. A drill and reamer designed to be passed through a well casing, comprising a stock having a bit at the lower end thereof and having a transverse opening above the bit, reamers disposed in said openings, each reamer having a pair of angle slots, pins passing through said slots and secured to said stock, said angle slots being formed so that when the pins occupy the upper end of said slots the reamers are in inoperative position, and when the pins occupy the lower end of said slots the reamers are in operative position, a mandrel vertically movable within the stock operatively connected to said reamers, a spring urging said mandrel upwardly, means for locking the mandrel against movement when said reamers are in operative position, said locking means normally projecting laterally from said stock and, on engaging the wall casing, releasing the said mandrel to permit movement of said reamers into inoperative position.

4. A drill and reamer designed to be passed through a well casing, comprising a stock having a bit at the lower end thereof and having a transverse opening above the bit, reamers disposed in said openings, each reamer having a pair of angle slots, pins passing through said slots and secured to said stock, said angle slots being formed so that when the pins occupy the upper end of said slots the reamers are in inoperative position, and when the pins occupy the lower end of said slots the reamers are in operative position, means urging to move said reamers into operative position, means for locking said reamers in operative position, said locking means normally projecting beyond the body of said stock and adapted on engaging the inner wall of the well casing, to release said reamers and permit movement thereof into inoperative position.

5. A reamer designed to be passed through a well casing, comprising a stock having a transverse opening, a pair of reamers disposed in said opening, said reamers having overlapping flanges and each reamer being provided with a pair of angle slots, pins passing through said slots and secured to said stock, said angle slots being formed so that when the pins occupy the upper end of said slots the reamers are in inoperative position, and when the pins occupy the lower end of said slots the reamers are in operative position, a vertically movable mandrel operatively connected to said reamers, a spring urging to move said mandrel upwardly and said reamers into operative position, and means locking said mandrel against movement and adapted, on engaging the inner walls of the well casing, to release said mandrel, permitting said reamers to move into inoperative position.

6. A drill and reamer designed to be passed through a well casing comprising a stock having a bit at the lower end thereof and having a transverse opening above the bit, a pair of reamers disposed in said opening, each reamer having a shank, a flange extending from the shank and overlapping the flange of the other reamer, a tooth portion depending from the shank, a tapered tongue on said tooth portion, the upper end of said bit being beveled for engagement and support of said tongue, and means urging said reamers into operative position, locking means holding said first named means against movement when said reamers are in operative position, but releasing said first named means on engaging the well casing and permitting said first named means to move said reamers into inoperative position.

7. A drill and reamer designed to be passed through a well casing, comprising a stock having a bit at the lower end thereof, a pair of reamers movable in the stock to occupy operating and inoperative positions, means for moving the reamers to operating position including a mandrel normally urged upwardly, means including a spring controlled key for locking the mandrel in a position in which the reamers are in operative position, said reamers being provided with slots and pins passing through said slots and secured to the stock, each of said pins passing through both of said reamers and limiting the outward and inward movement of the reamers.

8. A reamer, comprising a stock, reamer cutters movable in the stock and having ledges thereon, a mandrel movable in the stock and including a head formed with grooves for receiving the ledges, thereby providing an operative connection between the cutters and the mandrel, means co-acting with said cutters to limit the movement of the cutters into operative and inoperative positions, said means including stationary pins passing through angle slots in said cutters and a spring controlled key passing transversely through the stock and locking said mandrel against movement when said cutters are in operative position.

9. A reamer, comprising a stock having a passage therein, a socket intersecting the passage and a notch in communication with one end of the socket, a mandrel movable in said passage to occupy two extreme positions, said mandrel including a notched head movable across said socket, a spring urging said mandrel upwardly, a key movable in said socket, having a notch therein to engage said head and lock the same against movement, said key being normally urged to a position in which its notch locks said head, a head formed on the key adapted to be disposed within the first notch, and a pair of under reamer cutters operatively connected to said mandrel.

10. An under reamer, comprising a stock having a passage therein, a socket intersecting the passage, a mandrel movable in said passage, cutters provided at their upper ends with ledges, the mandrel being provided at its lower end with a head formed with grooves for the reception of the ledges of said cutters, thereby forming an operative connection therewith, a notch in said head, a key disposed in said socket, and adapted to lock said head against movement, said key projecting laterally from said stock and adapted, when the said key engages the well casing, to release the head of the mandrel, whereby the mandrel is permitted to move the cutters into inoperative position.

In testimony whereof I have signed my name to this specification.

JACOB S. BROWN.